(12) United States Patent
Rampson

(10) Patent No.: US 9,286,597 B2
(45) Date of Patent: Mar. 15, 2016

(54) TRACKING CO-AUTHORING CONFLICTS USING DOCUMENT COMMENTS

(75) Inventor: Benjamin Edward Rampson, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/436,051

(22) Filed: Mar. 30, 2012

(65) Prior Publication Data
US 2013/0262373 A1 Oct. 3, 2013

(51) Int. Cl.
G06F 17/00 (2006.01)
G06Q 10/10 (2012.01)
G06F 17/22 (2006.01)
G06F 17/24 (2006.01)

(52) U.S. Cl.
CPC ............ *G06Q 10/10* (2013.01); *G06F 17/2288* (2013.01); *G06F 17/246* (2013.01)

(58) Field of Classification Search
CPC .................... G06F 17/30592; G06F 17/30864; G06F 17/30557; G06F 17/30; G06F 17/30699; G06F 17/30943; G06F 17/30554; G06F 17/30705; G06F 7/00; G06F 17/30303; G06F 17/30312; G06F 17/30489
USPC .................................................. 707/728, 603
See application file for complete search history.

(56) References Cited

U.S. PATENT DOCUMENTS

| 6,006,239 | A  | 12/1999 | Bhansali et al. |
| 6,067,551 | A  | 5/2000  | Brown et al.    |
| 7,249,314 | B2 | 7/2007  | Walker et al.   |
| 7,593,943 | B2 | 9/2009  | Clarke et al.   |
| 7,792,788 | B2 | 9/2010  | Melmon et al.   |
| 7,865,465 | B2 | 1/2011  | Vierich et al.  |
| 2004/0177343 | A1 | 9/2004 | McVoy et al.    |
| 2004/0261013 | A1* | 12/2004 | Wynn et al. ................... 715/511 |
| 2007/0023507 | A1 | 2/2007 | Starbuck et al. |
| 2008/0263442 | A1 | 10/2008 | Plumley et al.  |

(Continued)

OTHER PUBLICATIONS

Thyagaraju.G.S., M.M.Math, Umakant P. Kulkarni', and A. R. Yardi. Conflict Resolving Algorithms to Resolve Conflict in Multi-user Context-Aware Environments. Mar. 6-7, 2009. http://ieeexplore.ieee.org/stamp/stamp.jsp?arnumber=04809007. 7 Pages.

(Continued)

*Primary Examiner* — Truong Vo
(74) *Attorney, Agent, or Firm* — Damon Rieth; Tom Wong; Micky Minhas

(57) ABSTRACT

A comment infrastructure for managing co-authoring conflict resolutions is provided. During co-authoring, multiple users may make edits to a document at the same time or users may merge edits to a document. Embodiments determine if changes submitted by a user conflict with previously submitted changes. If a conflict is found, the conflicting change may be saved to the document as a comment, allowing for the user to choose when to resolve the conflict. The original content and the different co-authoring edits may be displayed side-by-side, allowing users to make an informed decision about a desired resolution of a conflict. Additional commenting functionalities may be provided for allowing users to leave comments, replies, or messages associated with a co-authoring conflict, providing communication and collaboration between users about a best way to resolve a co-authoring conflict.

20 Claims, 11 Drawing Sheets

(56) References Cited

U.S. PATENT DOCUMENTS

| | | | |
|---|---|---|---|
| 2009/0327294 A1 | 12/2009 | Bailor et al. | |
| 2009/0327358 A1 | 12/2009 | Lukiyanov et al. | |
| 2011/0252339 A1* | 10/2011 | Lemonik et al. | 715/753 |
| 2012/0072854 A1* | 3/2012 | Zhou | 715/751 |

OTHER PUBLICATIONS

Document collaboration and co-authoring. Retrieved Date: Jul. 27, 2011. http://office.microsoft.com/en-us/sharepoint-server-help/document-collaboration-and-co-authoring-HA101812148.aspx. 9 Pages.

Ignat, C-L. et al., "Flexible Definition and Resolution of Conflicts through Multi-level Editing," *International Conference on Collaborative Computing: Networking, Applications and Worksharing*, pp. 1-10 (Nov. 2006).

International Search Report and Written Opinion for PCT/US2013/032739 mailed Jul. 2, 2013.

"Supplementary Search Report Issued in European Patent Application No. 13770102.5", Mailed Date: Oct. 30, 2015, 9 Pages.

Sun et al., "Consistency Maintenance in Real-Time Collaborative Graphics Editing Systems", In Journal of the ACM Transactions on Computer-Human Interaction, vol. 9, No. 1, Mar. 1, 2002, pp. 1-41.

* cited by examiner

TRACKING CO-AUTHORING CONFLICTS USING DOCUMENT COMMENTS

BACKGROUND

Allowing co-authoring of a document can oftentimes be a complex task. For example, if two or more users concurrently edit the same part or directly related parts of a document, conflicts may occur in the edits being made. Resolving conflicts and merging changes is oftentimes a challenge of a co-authoring enabled application. The challenge may be compounded when co-authoring edits are completed in an offline state since an application may not be aware of multiple users editing a same portion of a document until the changes are submitted.

Currently, there are various methods of dealing with or avoiding such merge conflicts. For example, some applications may follow a "last saved wins" model wherein a user's edits to content that are saved after another user's edits to the same or related content override the conflicting content of the first user. As can be appreciated, this method may be undesirable since edits made by a first user may be lost.

As another example, some applications may use a "first saved wins" model wherein changes made by a first user are applied and changes to the same or related content made by a second user are blocked from being saved to avoid a conflict. As can be appreciated, this method may be undesirable since users may be required to reapply their work on updated content.

As another example, some applications may allow a second user to decide if he/she wants to keep a first user's changes or to apply his/her own changes. That is, the second user may decide whether to use the "last saved wins" model or the "first saved wins" model. A problem with this method is that the user oftentimes must decide which changes to apply at save time, which can be an all-or-nothing scenario wherein one user's changes may be lost.

As another example, some applications lock parts of a document that are being authored or edited by another user. For example, if a first user may be editing a paragraph or a block of cells, a second user may be unable to edit the same section. This method may require the users to be online and can oftentimes be disruptive depending on the size of the area being locked. For example, an entire table of a spreadsheet may be blocked while other users may be trying to fill in data in unique columns they each own at the same time.

As can be appreciated, the current methods described above do not provide an easy way for multiple users to merge their changes. Oftentimes, current co-authoring methods reflect a big hammer approach where edits of one user win out over the other user. Challenges, such as the challenges described above, may make co-authoring difficult when conflicts arise, which may cause users to avoid co-authoring.

It is with respect to these and other considerations that the present invention has been made.

SUMMARY

Embodiments of the present invention solve the above and other problems by providing conflict comments to help track, merge, and resolve co-authoring conflicts.

According to embodiments, when a merge conflict occurs during co-authoring of a document, changes made by users that cause the conflict may be captured as comments in the document. Conflicts may be saved so that users are not required to resolve conflicts immediately. A user may be allowed to choose when to resolve the conflict. For example, a user can choose to resolve a conflict immediately, continue editing and temporarily ignore the conflicts, or stop editing the document and switch to a different task.

By utilizing a comment infrastructure, an inline view of conflicts within a document may be provided and may allow users to temporarily postpone decisions on how to deal with merge conflicts. This may allow users to continue to work on editing a document while not losing the context of conflicts and other changes as they make additional updates and thus avoiding a break in workflow to resolve conflicts.

Embodiments provide for collaborative conflict resolution. By utilizing a comment infrastructure, a user may be able to provide additional typed comments about a conflict, allowing for communication and collaboration with other users about resolving the conflict. Embodiments provide for allowing other document readers/reviewers an ability to see conflicts and proposals inline as they are reading a document, enabling them to be aware of the conflicts before they are resolved.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
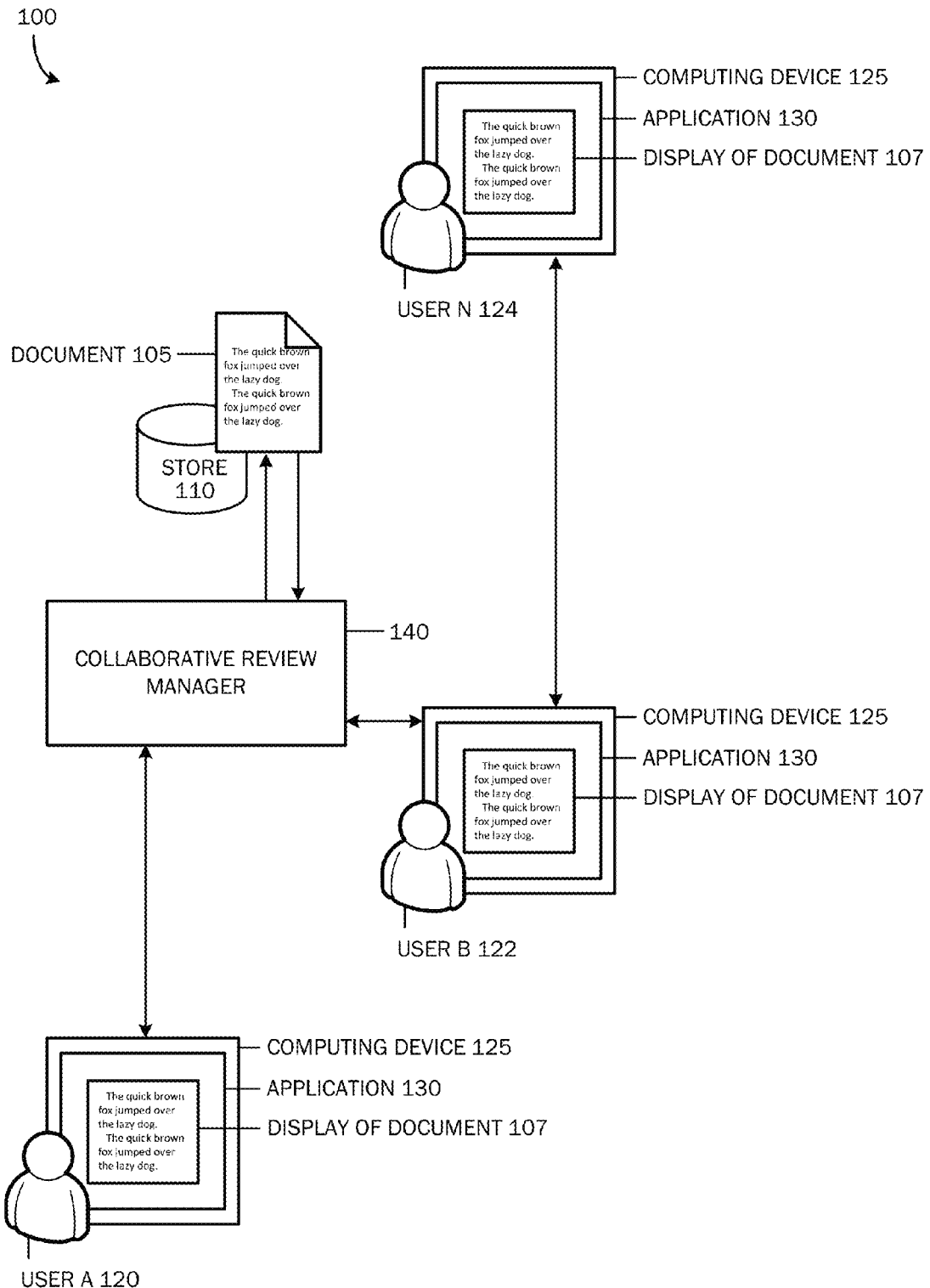
FIG. 1 is a simplified block diagram of a system architecture in which embodiments of the present invention may be practiced.

As briefly described above, embodiments of the present invention are directed to providing conflict comments to help track, merge, and resolve co-authoring conflicts. In a collaborative review process, it is common for more than one user to access and make edits to a document. This may be referred to as co-authoring. Oftentimes, multiple users may make edits to a document at the same time or may make changes to a document offline and subsequently merge the changes with the parent document. When more than one user makes edits to a same block of content within a document, conflicts may arise.

As one example, two users may simultaneously edit a cell value in a spreadsheet document. One of the users may save his changes. The other user, who may be unaware that the other user is editing the same cell, may save his changes, consequently overriding the changes made by the first user. As can be appreciated, this may be an unfavorable scenario since the edits made by the first user may be potentially lost without having been viewed and considered by other users.

Embodiments of the present invention provide a comment infrastructure for managing co-authoring conflict resolutions. When merge conflicts occur during co-authoring of a document, the changes which conflict with changes made by a first user may be captured as comments in the document. This allows the document to be saved, capturing the edit information inline in the document. This may allow for the second user to have a choice as to when to resolve conflicts. For example, the second user may resolve the conflicts immediately, or he may continue editing and temporarily ignore the conflicts, or he may stop editing the document and switch to a different task. Embodiments provide for saving conflicts allowing multiple users to communicate and collaborate about a best way to resolve a conflict issue. Other users may be able to see conflicts and proposals on how to resolve the conflicts inline while reviewing a document. Embodiments may be leveraged with an existing comment infrastructure and document review infrastructure to provide merge conflict comments and to provide original content and various co-authoring edits side-by-side. Embodiments may be utilized to help users make more informed decisions about a desired resolution of a conflict.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to the drawings, in which like numerals represent like elements, various embodiments will be described. FIG. 1 illustrates a system 100 for co-authoring a document and for providing a comment infrastructure for managing co-authoring conflict resolutions. As illustrated, system 100 may include a collaborative review manager 140 operable to allow simultaneous collaborative review of a document 105. For example, the collaborative review manager 140 may assist in synchronizing changes made by various users 120,122,124 to document 105. According to an embodiment, the document 105 may be stored in a data store 110 that may be accessed by various users who may be located in remote locations. For example, the document 105 may be stored in a document library that is accessible on a network. Various users 120,122,124 may access the document 105 to review, make changes to, and/or provide comments on the document. Users may access the document at the same or different times, without need to ensure that only one user has the document open at a time. According to one embodiment, a user may download a document to a local computing device 125 to make edits. The user may subsequently merge his changes with the document 105 stored in the data store 110.

Users 120,122,124 may access the document 105 via a computing device 125 including an application 130 providing reviewing and/or editing ability on document 105. A display 107 of document 105 may be provided on a display surface of computing device 125. Computing device 125 may be one of various types of computing devices, including wired and wireless personal computers, laptop computers, handheld mobile computing devices, for example, mobile telephones, tablet type computers, slate type computers, and the like. Computing device 125 may include a rich client application 130, for example, a program from the MICROSOFT OFFICE suite of applications, such as MICROSOFT WORD, which may provide a rich set of functionality for editing and changing structure of document 105. Computing device 125 may include a thin client application 130 that may provide a limited set of functionality (as compared to rich client application) for reviewing document 105. For example, thin client application may be a web interface that displays document 105 and may provide commenting functionality. When edits made to a document are submitted by a user 120,122,124, the changes may be saved to the document 105 on the server or document store 110. According to embodiments, if an edit made to a document 105 by a user conflicts with an edit submitted by another user, the conflict(s) may be saved to the document as a comment.

Figure 2:
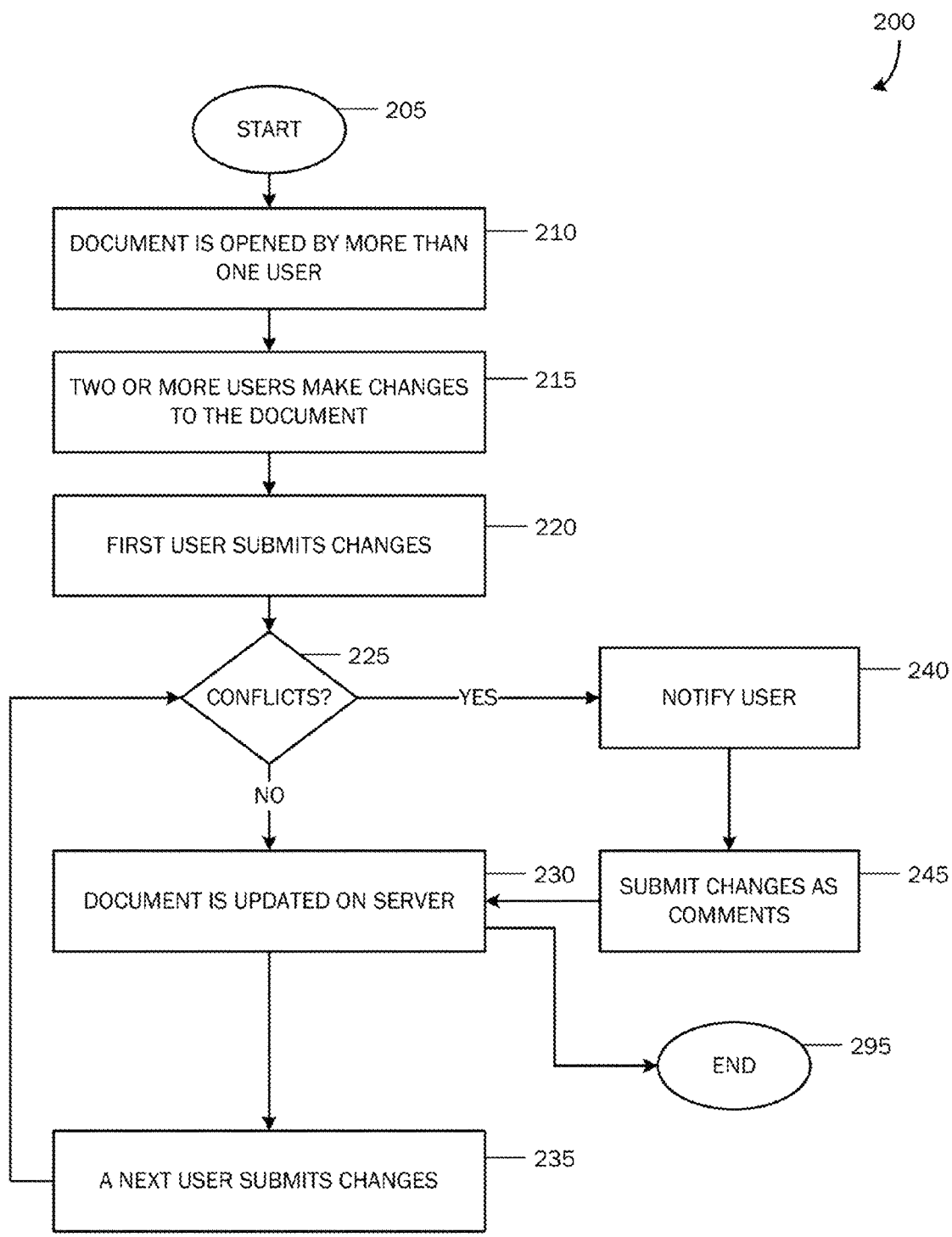
FIG. 2 is a flow chart of a method for tracking co-authoring conflicts using document comments.

Referring now to FIG. 2, a method 200 for tracking co-authoring conflicts using document comments is provided. The method 200 starts at OPERATION 205 and proceeds to OPERATION 210, where a co-authoring enabled document 105 is accessed by one or more users 120,122,124. The document may be one of various types of documents, such as, but not limited to, a word processing document, a spreadsheet document, a computer graphics document, a slide presentation, and the like. As described with reference to FIG. 1, the document 105 may be stored in a documents store 110 accessible to various users via a network. The plurality of users 120,122,124 may access the document 105 via an application program 130 on computing device 125.

Figure 3:
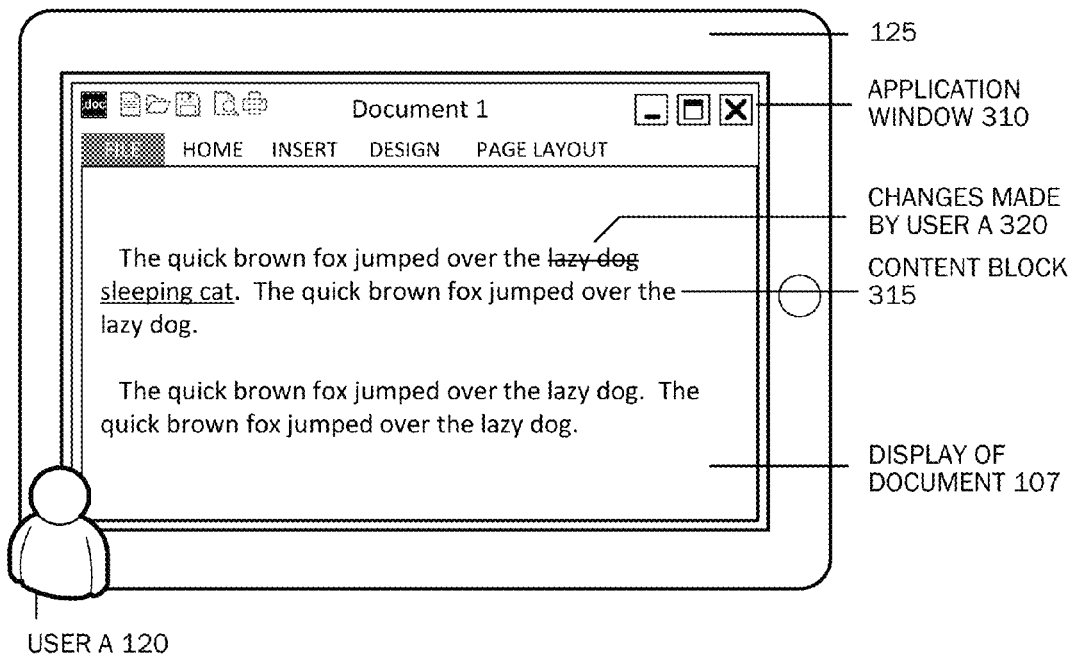
FIG. 3 is an illustration of an example document being edited by multiple users.
Figure 3:
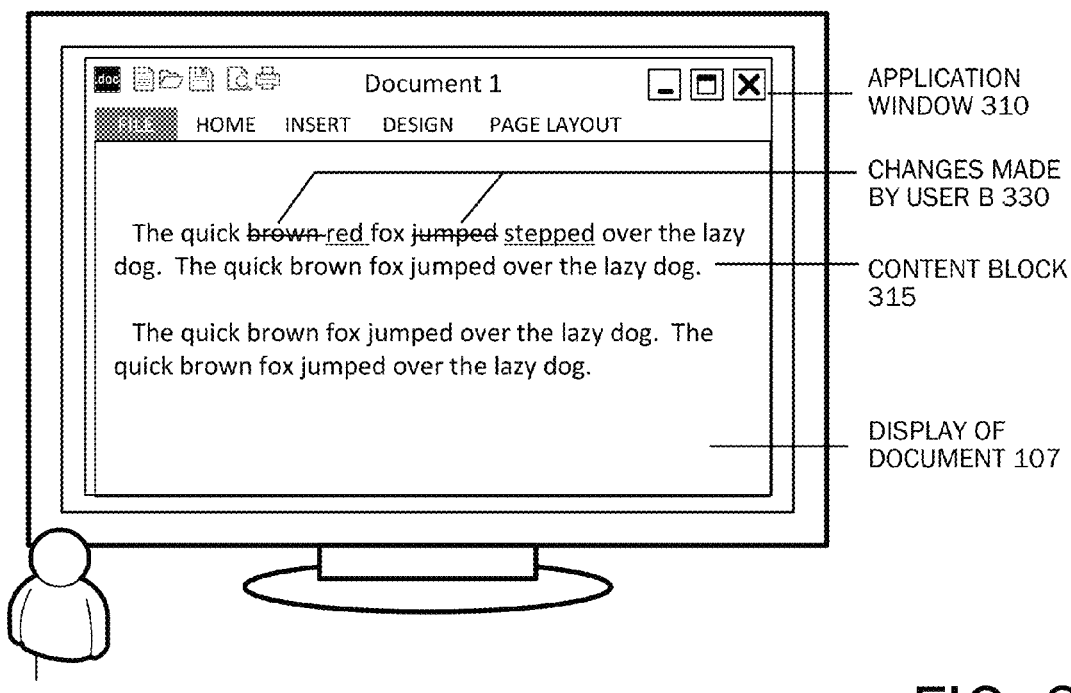

At OPERATION 215, the one or more users may make changes to document 105. For example, and with reference now to FIG. 3, user A 120 and user B 122 may make changes to a same content block 315 in the document 105. A content block 315 may include a variable amount of content, depending on the type of document, the type of content, the amount of content, or settings. For example, in a word processing document, a content block 315 may be a paragraph, a sentence, a word, a table, a portion of a table, etc. In a spreadsheet application, a content block 315 may be a cell, a table, a portion of a table, a range of cells such as a row, a column, a group of cells, or a determined section of a document 105. In the example illustrated in FIG. 3, the content block 315 is a paragraph. As shown in FIG. 3, the original content block 305 includes the sentences, "The quick brown fox jumped over the lazy dog. The quick brown fox jumped over the lazy dog."

As illustrated, a display of the document 107 is provided in an application window 310, wherein user A 120 may make changes 320 to the document. For example, user A may delete content (e.g., delete "lazy dog") and add content (e.g., "sleeping cat"). Concurrently, user B 122 may make other changes 330 to the same content block 315. The changes 330 made by user B 122 may or may not directly conflict with user A's changes 320.

Referring back to FIG. 2, at OPERATION 220, a first user, in this example, user A 120, submits the changes 320 made to the document 105. For example, user A may submit changes via a selection of a save command 405. Upon receiving an indication of a selection to save changes 320 to the document 105, a determination may be made at DECISION OPERATION 225 whether the submitted changes may conflict with changes submitted by another user 122,124. If no conflicts are found, the document 205 in the document store 110 may be updated with the changes 320 at OPERATION 230.

At OPERATION 235, a next user may submit changes made to the document 105. For example, user B's changes 330 (e.g., "red fox stepped") may be submitted. The method 200 returns to DECISION OPERATION 225 to determine if the submitted changes 330 may conflict with the changes 320 submitted by another user 120,124. According to one embodiment, the determination may include identifying where the submitted changes 330 are located in the document 105 and determining if the submitted changes have been made within a content block 315 previously edited by other users 120,122,124. For example, user B's changes 330 may be compared with user A's changes 320 to determine if the users may have made changes to the same piece of content (i.e., content block 315).

Figure 4:
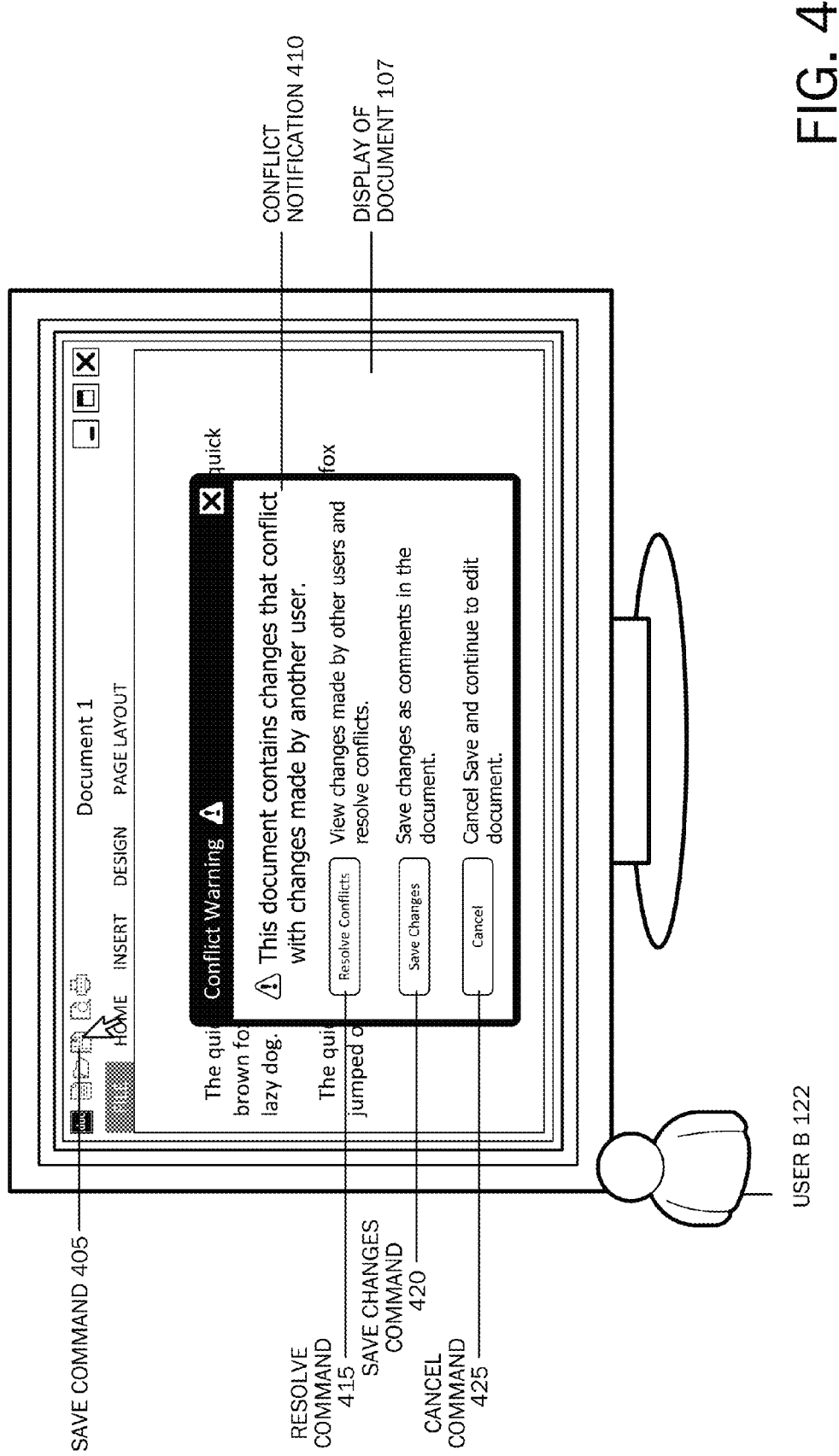
FIG. 4 is an illustration of an example notification of a conflict provided to a user.

According to an embodiment, and as illustrated in FIG. 4, if a conflict is determined at DECISION OPERATION 225, at OPERATION 240, a notification 410 of the conflict may be provided to the user 122. According to one embodiment, the conflict notification 410 may be provided to the user making the subsequent changes. For example, when user B 122 submits his changes 330 (e.g., via selection of a save command 405), and a determination is made that another change 320 within the same content block 315 has been submitted by another user 120, the conflict notification 410, may be provided to user B in a dialog as illustrated in FIG. 4. According to another embodiment, the conflict notification 410 may be provided to any user 120,122,124 concurrently editing the document 105.

A conflict notification 410 may include one or more selectable functionalities. For example, the conflict notification 410 may include a resolve command 415, wherein selection of the resolve command may allow the user 122 to view (and resolve, if desired) the conflicting changes made by other users. A save changes command 420 may be provided in the conflict notification 410, wherein selection of the save changes command may submit the user's 122 changes 330 as comments in the document 105 (OPERATION 245), and the document 105 may be updated with the changes as comments (OPERATION 230). That is, the changes made by the subsequent user (user B 122) do not override the changes previously submitted by user A 120, nor are they discarded. Instead, the changes 330 are preserved as comments allowing for the conflicts may be reviewed and resolved either by the user 122 or by other users 120,124.

According to another embodiment, if a conflict is determined, the document 105 may be updated with the original content of the content block 305 where the conflict is found, and the conflicting changes 320,330 made by the various users (e.g., user A 122 and user B 124) may be saved to the document as comments. A cancel command 425 may be provided, which when selected, may cancel the save operation and allow the user 122 to continue to edit the document.

Other functionalities may be provided. According to an embodiment, commenting functionalities may be provided, allowing users 120,122,124 to communicate with each other via comments, replies to comments, messages, etc., allowing for communication and collaboration about a best way to resolve a conflict. The method ends at OPERATION 295.

Figure 5A:
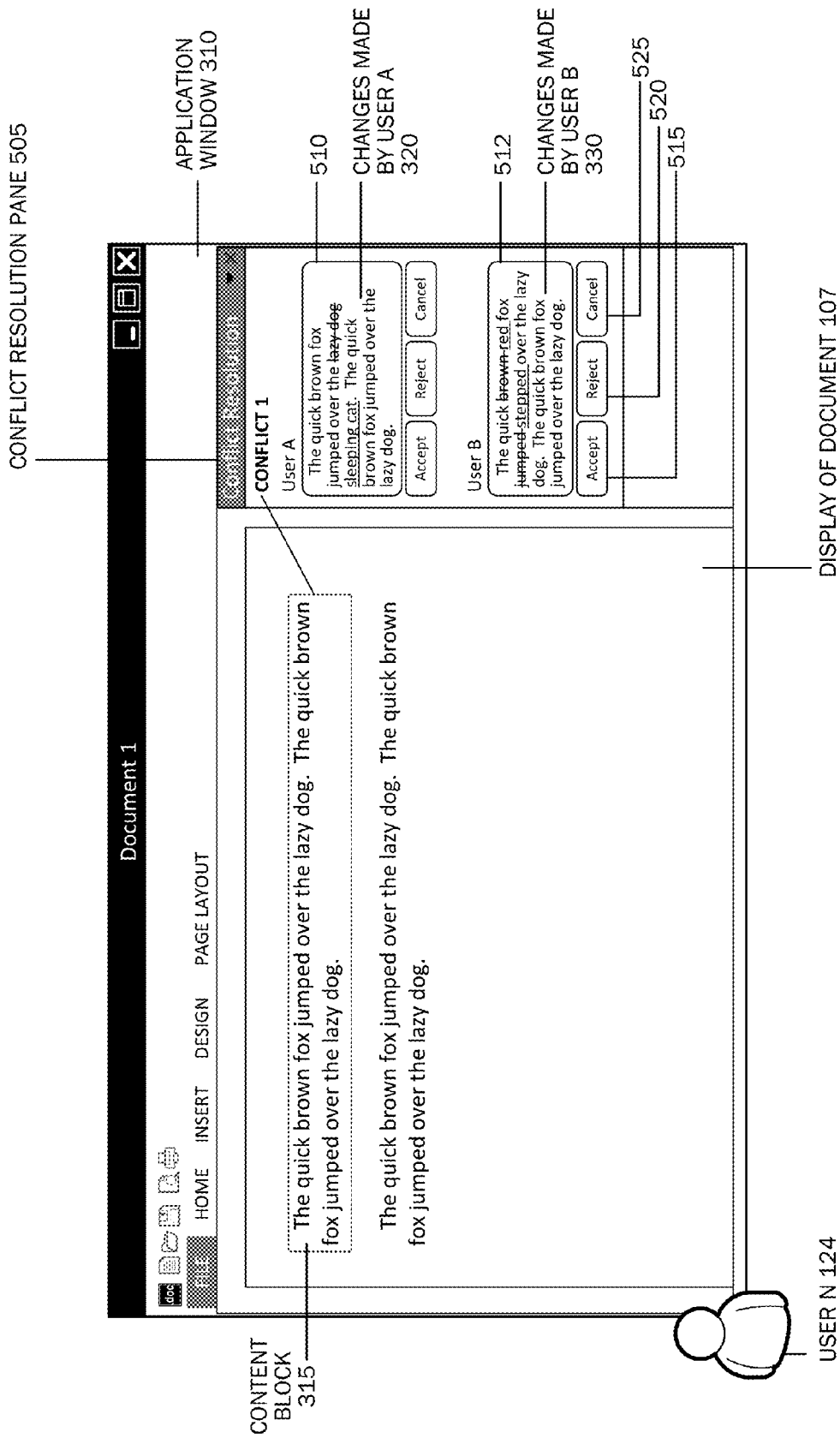
FIG. 5A is an illustration of an example conflict displayed to a user in a conflict resolution pane, the conflict occurring in a word processing document.

Referring now to FIG. 5A, an illustration of an application window 310 with a display of a document 107 and a conflict resolution pane 505 is shown. According to one embodiment, a conflict resolution pane 505 may be provided, the conflict resolution pane including changes 320,330 submitted by a user 120,122,124 that have been determined to conflict with changes submitted by another user. According to another embodiment, conflicts may be displayed as in-line comments in the document display 107.

According to embodiments, the illustration shown in FIG. 5A is an example of what may be displayed to a user 120, 122,124 upon selection of a resolve command 415 provided in a conflict notification 410, automatically displayed upon a determination of a conflict, or provided when opening a document 105 containing one or more conflicts. Conflict comments may be visible to any user N 124 who updates or accesses the document 105 after the second user's submission of changes.

As illustrated, a display of the document 107 may be provided in the application window 310. A content block 315 (a paragraph in this example) is shown highlighted and associated with a conflict in the conflict resolution pane 505. According to one embodiment and as shown in FIG. 5A, a content block 315 determined to contain conflicting changes 320,330 may be displayed in its original format (i.e., without any changes applied). The conflicting changes 320,330 may be displayed as comments 510,512 as illustrated. The comments may be provided in a conflict resolution pane 505 as shown, or alternatively, may be shown as in-line comments within the display of the document 107. Each conflict comment 510,512 may include a conflicting change 320,330, and may include selectable functionality controls such as an accept button 515 for allowing a user 124 to accept a change, a reject button 520 for allowing a user to reject a change, and a cancel button 525 for cancelling out of a conflict comment. For example, if an accept button 515 is selected for a conflict comment 512, the changes in the conflict comment may replace the associated original content in the document.

Figure 5B:
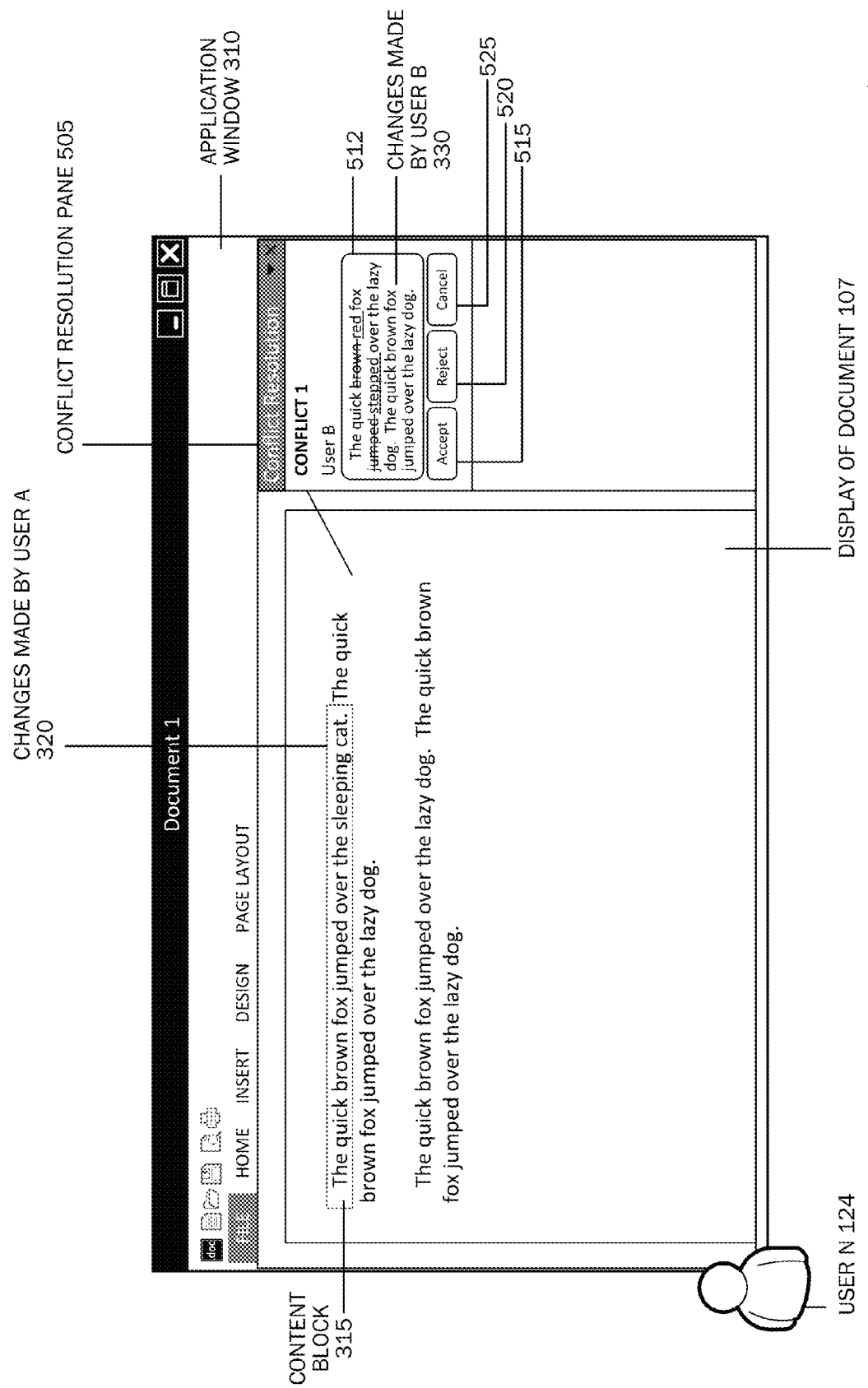
FIG. 5B is another illustration of an example conflict displayed to a user in a conflict resolution pane, the conflict occurring in a word processing document.

According to another embodiment, and as shown in FIG. 5B, a change 330 made to content 315 by a user 122 that conflicts with a change 320 made and submitted previously by a first user 120 may be displayed as a comment 512 while the change 320 submitted by the first user 120 is shown in the updated content of the document 107. By displaying the change 320 made by the first user 120 in the updated content 315 of the document 107 and providing the conflicting change 330 made by the second user 122 as a comment 512, users 120,122,124 may be able to view conflicts with the second user's change(s) 330 shown against the first user's updated content. As previously described and as shown in FIG. 5B, a content block 315 may be a sentence.

Other functionalities may be provided. According to one embodiment, additional commenting functionalities may be provided for allowing a user to leave additional comments about a conflict, allowing multiple users to communicate and collaborate about a best way to resolve an issue, and to allow other users to see conflicts and proposals of how to resolve the conflicts before they are resolved. According to another embodiment, other commenting functionalities may be provided, for example, an ability to skip to a next conflict comment and an ability to retrieve information about a user leaving a comment or making a conflicting change to a document. For example, two users make enter different sales numbers into a same cell in a spreadsheet. One of the users or another user may see the conflict and leave an additional comment asking the other user how he derived his number. As can be appreciated, the resolution may become a collaborative resolution process, allowing multiple users to communicate and resolve co-authoring conflicts.

Figure 6:
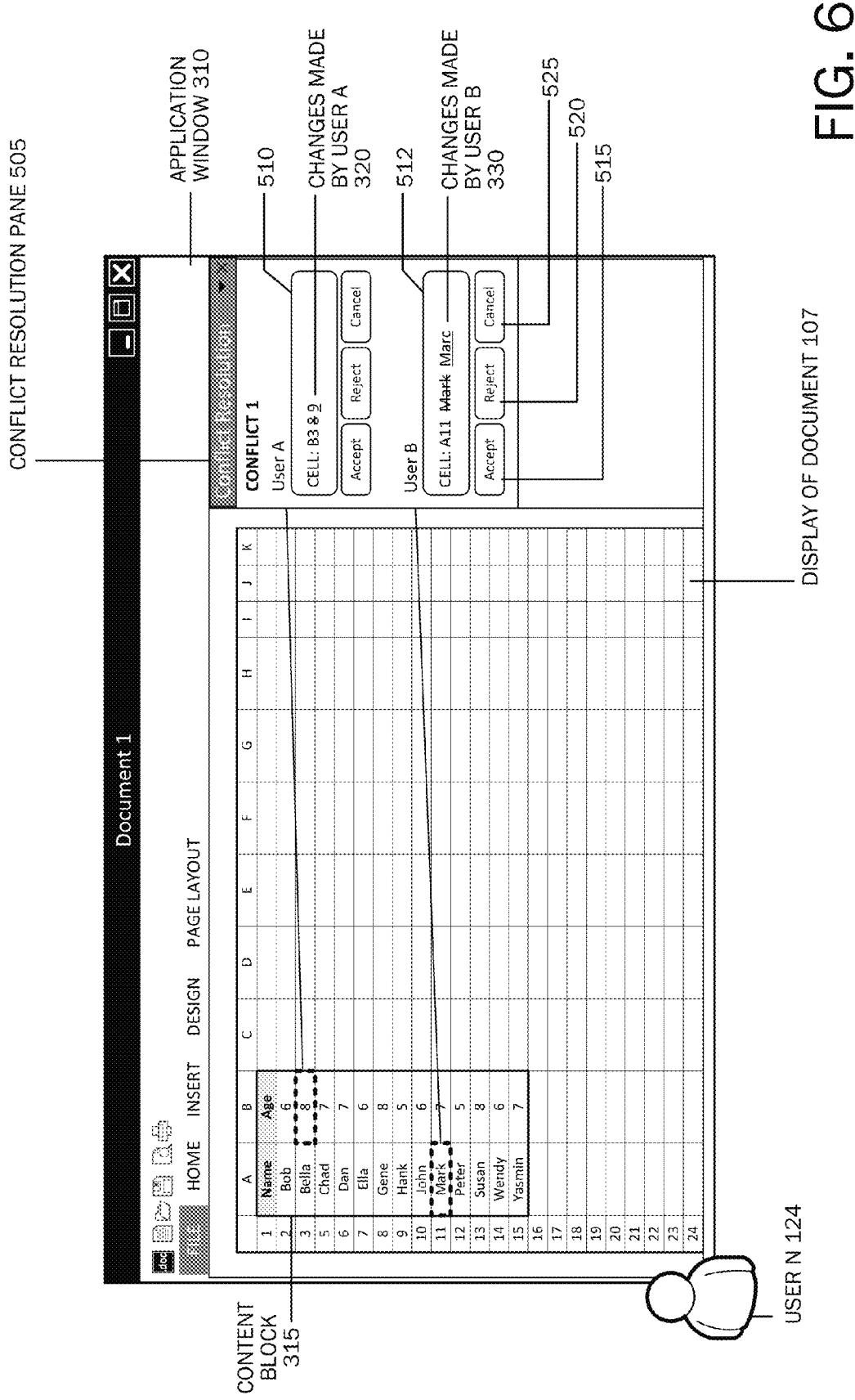
FIG. 6 is another illustration of an example conflict displayed to a user in a conflict resolution pane, the conflict occurring in a spreadsheet document.

Referring now to FIG. 6, a display of a document 107 (a spreadsheet in this example) containing a conflict is illustrated. In this example, the content block 315 is a table, wherein two users have made changes to the table concurrently. The cells containing the changes made are shown highlighted and associated with a conflict comment 510,512 in the conflict resolution pane 505. For example, the first conflict comment 510 is associated with cell B3 and shows the change 320 made by user A 120. The second conflict comment 512 is associated with cell A11 and shows the change 330 made by user B 122. Although the changes made by the two users 120,122 were determined as a conflict because changes were made within a table (in this example, the table being considered as a content block 315), the changes may in fact not conflict. In this example, both changes 320,330 in the conflict comments 510,512 may be accepted without overriding the other user's changes.

Figure 7:
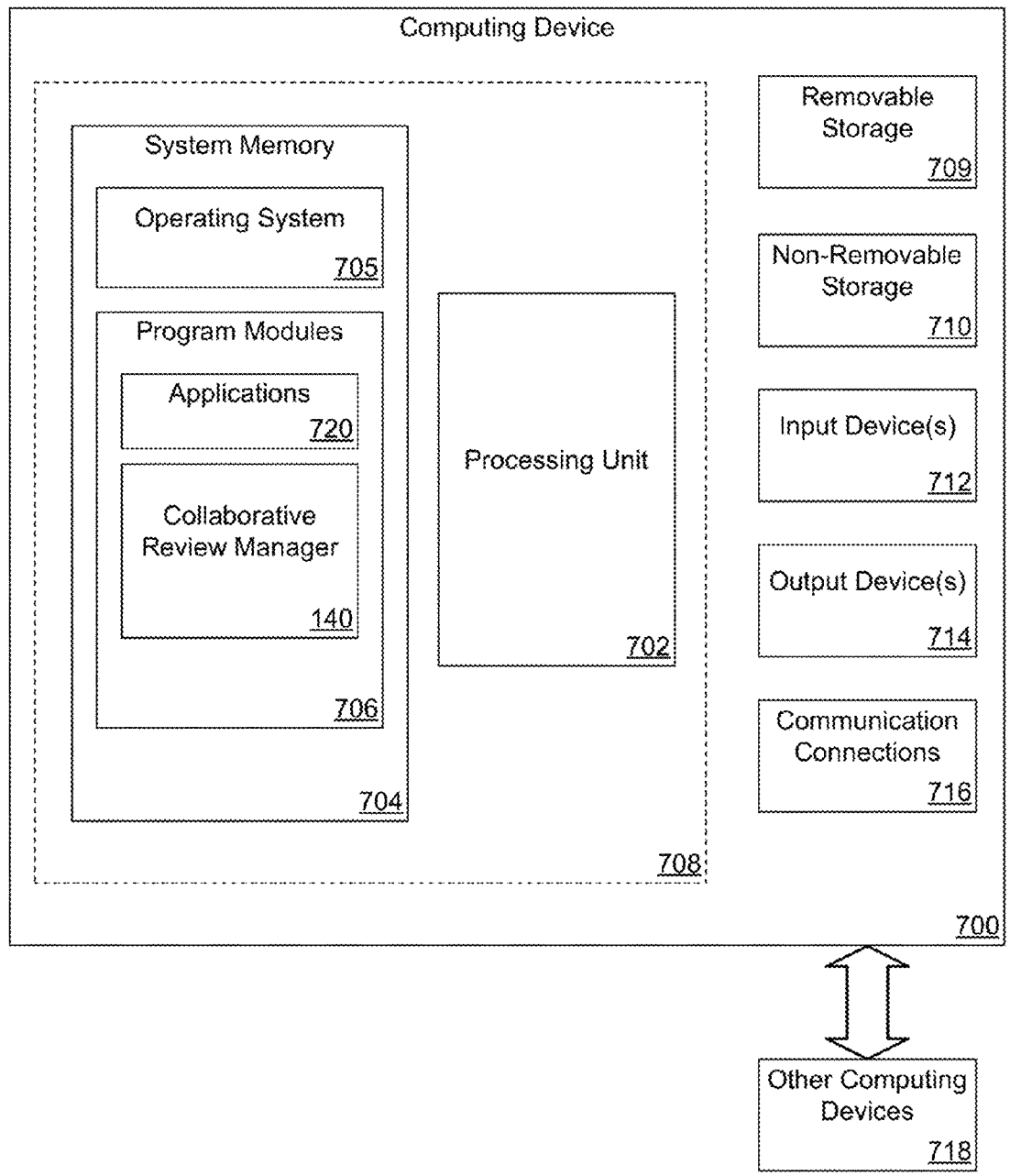
FIG. 7 is a block diagram illustrating example physical components of a computing device with which embodiments of the invention may be practiced.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. FIG. 3 illustrates an exemplary tablet computing device 125 executing an embodiment of the collaborative review manager 140. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 7 through 9 and the associated descriptions provide a discussion of a variety of operating environments in which embodiments of the invention may be practiced. However, the devices and systems illustrated and discussed with respect to FIGS. 7 through 9 are for purposes of example and illustration and are not limiting of a vast number of computing device configurations that may be utilized for practicing embodiments of the invention, described herein.

FIG. 7 is a block diagram illustrating example physical components (i.e., hardware) of a computing device 700 with which embodiments of the invention may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as the collaborative review manager 140. The operating system 705, for example, may be suitable for controlling the operation of the computing device 700. Furthermore, embodiments of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706, such as the collaborative review manager 140 may perform processes including, for example, one or more of the stages of the method 200. The aforementioned process is an example, and the processing unit 702 may perform other processes. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the collaborative review manager 140 may be operated via application-specific logic integrated with other components of the computing device 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 704, the removable storage device 709, and the non-removable storage device 710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 700. Any such computer storage media may be part of the computing device 700.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
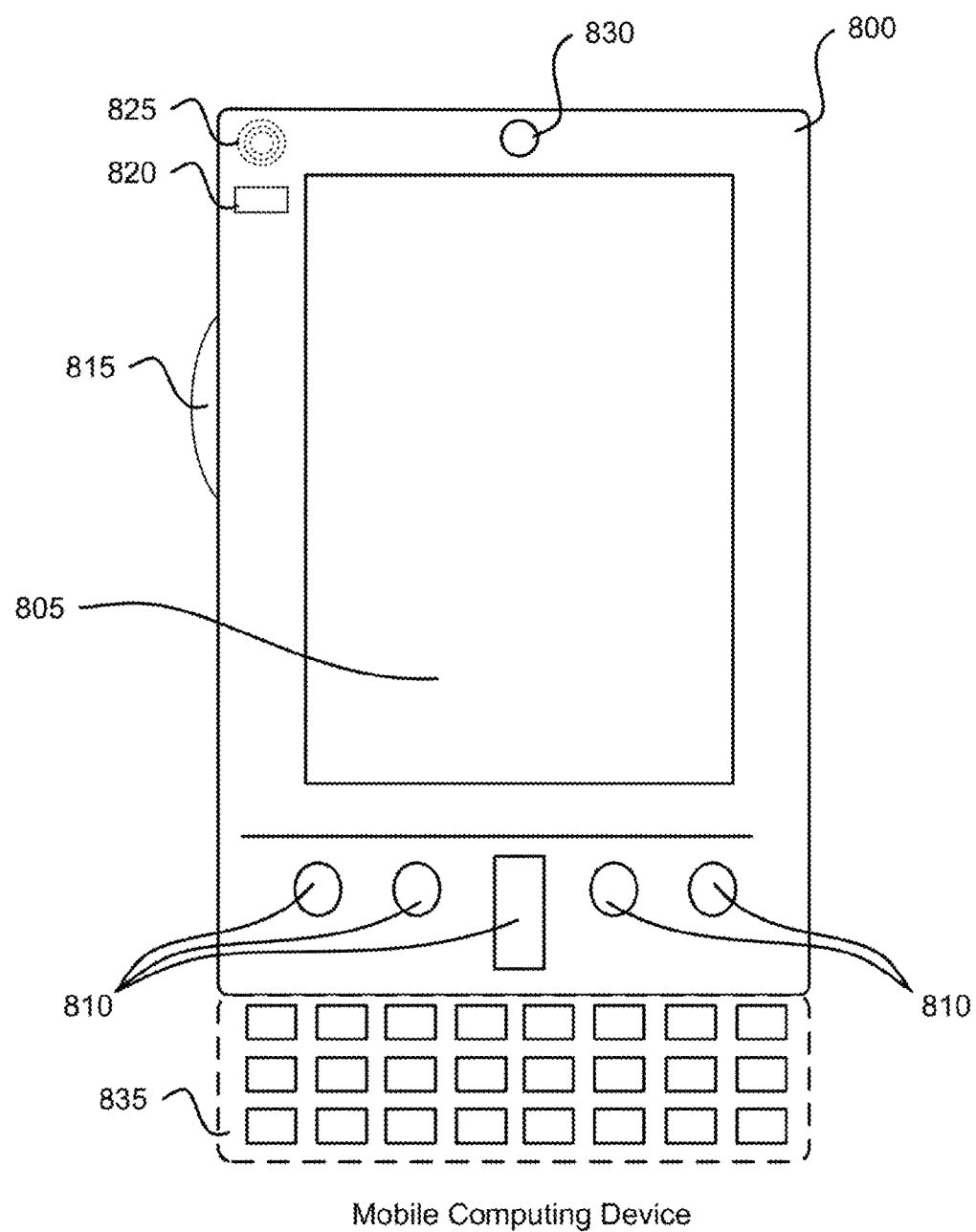
FIGS. 8A and 8B are simplified block diagrams of a mobile computing device with which embodiments of the present invention may be practiced.
Figure 8B:
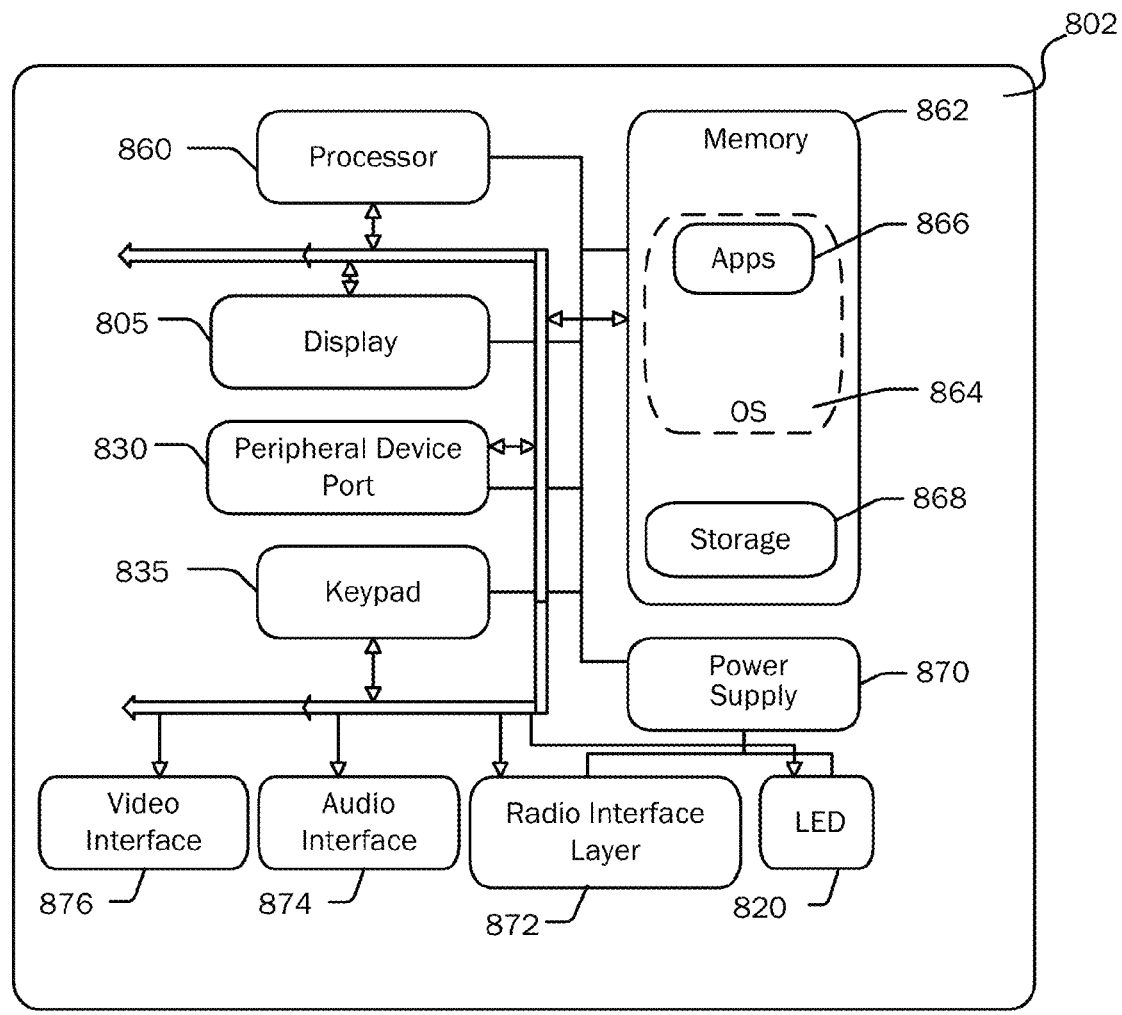
Figure 9:
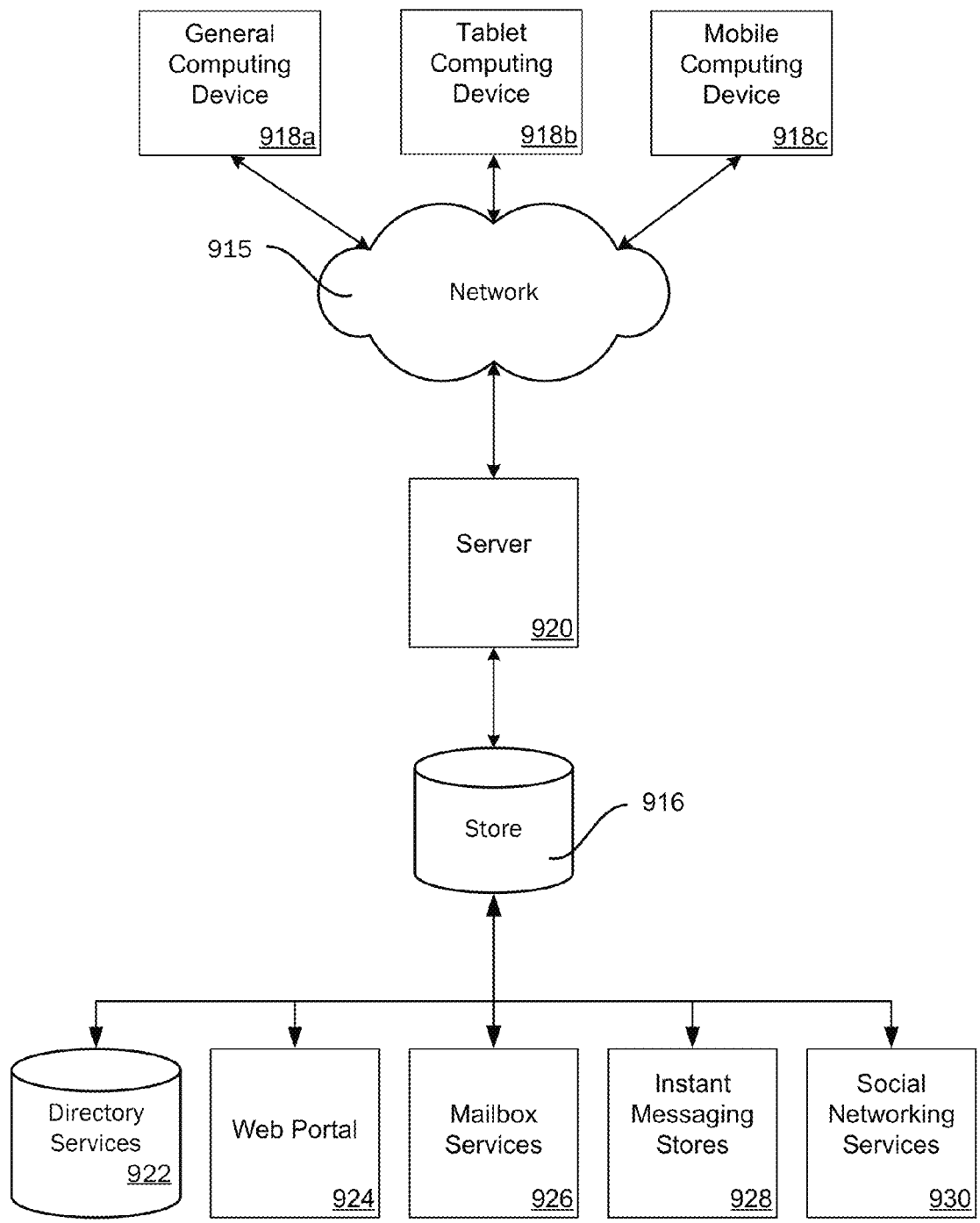
FIG. 9 is a simplified block diagram of a distributed computing system in which embodiments of the present invention may be practiced.

FIGS. 8A and 8B illustrate a mobile computing device 800, for example, a mobile telephone, a smart phone, a tablet personal computer, a laptop computer, and the like, with which embodiments of the invention may be practiced. With reference to FIG. 8A, an exemplary mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the collaborative review manager 140 described herein.

The system 802 has a power supply 870, which may be implemented as one or more batteries. The power supply 870 might further include an external power source, such as an AC adapter or a powered docking cradle that supplements or recharges the batteries. The system 802 may also include a radio 872 that performs the function of transmitting and receiving radio frequency communications. The radio 872 facilitates wireless connectivity between the system 802 and the "outside world", via a communications carrier or service provider. Transmissions to and from the radio 872 are conducted under control of the operating system 864. In other words, communications received by the radio 872 may be disseminated to the application programs 866 via the operating system 864, and vice versa.

The radio 872 allows the system 802 to communicate with other computing devices, such as over a network. The radio 872 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 802 provides notifications using the visual indicator 820 that can be used to provide visual notifications and/or an audio interface 874 producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868. Computer storage media may include volatile and nonvolatile, removable and non-removable media implemented in any method or technology for storage of information, such as computer readable instructions, data structures, program modules, or other data.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for providing the collaborative review manager 140 to one or more client devices, as described above. Content developed, interacted with or edited in association with the collaborative review manager 140 may be stored in different communication channels or other storage types. For example, various documents may be stored using a directory service 922, a web portal 924, a mailbox service 926, an instant messaging store 928, or a social networking site 930. The collaborative review manager 140 may use any of these types of systems or the like for enabling co-authoring conflict resolution via comments, as described herein. A server 920 may provide the collaborative review manager 140 to clients. As one example, the server 920 may be a web server providing the collaborative review manager 140 over the web. The server 920 may provide the collaborative review manager 140 over the web to clients through a network 915. By way of example, the client computing device 918 may be implemented as the computing device 900 and embodied in a personal computer 918*a*, a tablet computing device 918*b* and/or a mobile computing device 918*c* (e.g., a smart phone). Any of these embodiments of the client computing device 918 may obtain content from the store 916. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private Internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

I claim:

1. A method for managing co-authoring conflicts, the method comprising:
   providing simultaneous co-authoring access to a document by a plurality of users;
   receiving an indication to save a first change made to a content in the document by a first user;
   saving the first change made to the content in the document while simultaneously receiving edits to the content by a second user;
   receiving an indication to save a second change made to the content in the document by the second user;
   determining if the second change made to the content in the document conflicts with the first change made to the content in the document; and
   if a conflict is determined, saving the second change as a conflict comment associated with the content in the document and allowing the first user and second user to continue editing the document without resolving the conflict.

2. The method of claim 1, wherein determining if the second change made to the content in the document conflicts with the first change made to the content in the document includes identifying where the second change is located in the document and determining if the second change and the first change are in a content block.

3. The method of claim 2, wherein the content block includes a sentence, a paragraph, a cell, a table, or a determined section of the document.

4. The method of claim 1, further comprising providing the second change as the conflict comment in a display of the document.

5. The method of claim 4, wherein providing the second change as the conflict comment in the display of the document includes displaying the conflict comment in-line in the display of the document.

6. The method of claim 4, wherein providing the second change as the conflict comment in the display of the document includes displaying the conflict comment in a pane to a side of the display of the document.

7. The method of claim 4, further comprising providing a selectable functionality control for accepting the second change.

8. The method of claim 7, wherein accepting the second change includes replacing original content or a previously saved change with the second change.

9. The method of claim 4, further comprising providing commenting functionalities for allowing a user to provide a comment, reply, or a message associated with the second change.

10. The method of claim 1, further comprising providing a notification of the conflict.

11. A system for managing co-authoring conflicts, the system comprising:
a processing unit;
a data store that is configured to store a document that can be simultaneously accessed by a plurality of users; and
a collaborative review manager operative to:
provide simultaneous co-authoring access to the document by the plurality of users;
receive an indication to save a first change made to a content in the document, wherein the first change is made by a first user;
save the first change to the document while simultaneously receiving edits to the content by a second user;
receive an indication to save a second change made to the content in the document, wherein the second change is made by the second user;
identify where the second change is located in the document;
determine if the second change made to the content in the document and the first change made to the content in the document are located in a content block;
if the second change made to the content in the document and the first change made to the content in the document are located in the content block, determine the second change is a conflicting change; and
save the conflicting change as a conflict comment associated with the content in the document and allowing the first user and second user to continue editing the document without resolving the conflict.

12. The system of claim 11, wherein the collaborative review manager is further operative to provide the conflicting change as the conflict comment in a display of the document.

13. The system of claim 12, wherein the conflicting change is displayed in-line in the display of the document.

14. The system of claim 12, wherein the conflict comment includes original content before a change is received, the first change made to the content in the document, and the second change made to the content in the document.

15. The system of claim 14, wherein the conflict comment further includes a selectable functionality control for accepting the conflicting change, wherein accepting the conflicting change includes replacing the original content or a previously saved change with the conflicting change.

16. The system of claim 11, wherein the collaborative review manager is further operative to provide commenting functionalities for allowing a user to provide a comment, reply, or a message associated with the conflicting change.

17. The system of claim 11, wherein the content is highlighted to indicate the conflict comment.

18. The system of claim 11, wherein the first user and the second user collaboratively resolve the conflict comment.

19. The system of claim 11, wherein the first user and the second user are allowed to comment on the conflict comment.

20. A computer-readable storage device having computer-executable instructions for managing co-authoring conflicts, comprising:
providing simultaneous co-authoring access to a document by a plurality of users;
receiving an indication to save a first change made to a content in the document, wherein the first change is made by a first user;
saving the first change made to the content in the document while simultaneously receiving edits to the content by a second user;
receiving an indication to save a second change made to the content in the document, wherein the second change is made by the second user;
identifying where the second change is located in the document;
determining if the second change made to the content in the document and the first change made to the content in the document are located in a content block;
if the second change made to the content in the document and the first change made to the content in the document are located in the content block, determining the second change is a conflicting change;
saving the conflicting change as a conflict comment associated with the content in the document and allowing the first user and second user to continue editing the document without resolving the conflict;
providing the conflicting change as the conflict comment in a display of the document, wherein the conflict comment includes original content before a change is received, the first change made to the content in the document, the second change made to the content in the document, and a selectable functionality control for accepting the conflicting change, wherein accepting the conflicting change includes replacing the original content or a previously saved change with the conflicting change; and
providing commenting functionalities for allowing a user to provide a comment, reply, or a message associated with the conflicting change.

* * * * *